(12) United States Patent  
Wimberley

(10) Patent No.: US 8,061,920 B2  
(45) Date of Patent: Nov. 22, 2011

(54) PIVOTING BALL MOUNT HAVING FOUR EQUALLY SPACED CONTACT POINTS

(75) Inventor: David L. Wimberley, Winchester, VA (US)

(73) Assignee: Wimberley, Inc., Winchester, VA (US)

( * ) Notice: Subject to any disclaimer, the term of this patent is extended or adjusted under 35 U.S.C. 154(b) by 322 days.

(21) Appl. No.: 11/947,565

(22) Filed: Nov. 29, 2007

(65) Prior Publication Data

US 2008/0121767 A1     May 29, 2008

Related U.S. Application Data

(60) Provisional application No. 60/861,680, filed on Nov. 29, 2006.

(51) Int. Cl.  
    *F16C 11/06*      (2006.01)  
    *G10K 11/00*      (2006.01)

(52) U.S. Cl. ....... 403/90; 403/122; 403/137; 248/181.1; 248/181.2

(58) Field of Classification Search ............. 403/66, 403/76, 83, 90, 122, 137; 248/181.1, 181.2  
See application file for complete search history.

(56) References Cited

U.S. PATENT DOCUMENTS

| | | | |
|---|---|---|---|
| 357,299 A | 2/1887 | Wright | 248/181.1 |
| 578,998 A * | 3/1897 | Loebs | 403/90 |
| 596,207 A | 12/1897 | Hart | 403/90 |
| 687,183 A | 11/1901 | Kolander | 403/131 |
| 973,558 A | 10/1910 | Pierce | 285/64 |
| 1,290,830 A | 1/1919 | Fungo-Giera | 89/40.06 |
| 1,539,277 A | 5/1925 | Schenck | 403/90 |
| 2,580,990 A * | 1/1952 | Bannister | |
| 3,441,222 A | 4/1969 | Law | 239/280.5 |
| 3,691,788 A * | 9/1972 | Mazziotti | 403/122 |
| 3,790,965 A | 2/1974 | Gelbenegger | 623/38 |
| 3,958,904 A | 5/1976 | Rusbach | 403/90 |
| 4,480,418 A * | 11/1984 | Ventrella | 403/64 |
| 4,974,802 A * | 12/1990 | Hendren | 248/181.1 |
| 5,544,968 A | 8/1996 | Goellner | 403/31 |
| 5,704,578 A * | 1/1998 | Fischer | 403/122 |
| 5,871,186 A | 2/1999 | Bothe | 248/181.1 |
| 6,152,696 A * | 11/2000 | Rampal | |
| 6,352,228 B1 | 3/2002 | Buerklin | 248/181.1 |

(Continued)

FOREIGN PATENT DOCUMENTS

EP     1278088 A2 *   1/2003

(Continued)

*Primary Examiner* — Victor MacArthur  
(74) *Attorney, Agent, or Firm* — Robert Platt Bell

(57) ABSTRACT

The present invention provides four essentially equal and (generally) evenly spaced constraints on the ball. It is the equivalent of a ball and socket joint in which the "socket" is composed of four small constraining pads of equal size and equally spaced around the surface of the ball or sphere. If a sphere is constrained by four equidistant points, each point will exert the same amount of force on the sphere. If additional pressure is applied to one point, the pressure exerted by the other points will rise to match this increased pressure. The effect of constraining a smooth ball by four equidistant points is to create the equivalent of a ball and socket joint in which the force required to rotate the ball at a particular rate is about the same in any direction. The ball is constrained by four equidistant points such that the relative movement between the ball and housing is smooth and predictable in any direction.

1 Claim, 9 Drawing Sheets

U.S. PATENT DOCUMENTS

| | | | |
|---|---|---|---|
| 6,439,518 B2 | 8/2002 | Brotz | 248/187.1 |
| 6,513,774 B2 | 2/2003 | Hailson | 248/288.51 |
| 6,568,871 B2 * | 5/2003 | Song et al. | 403/76 |
| 2005/0016433 A1 | 1/2005 | Laiho | 111/249 |
| 2005/0045783 A1 | 3/2005 | Brumley | 248/181.1 |

FOREIGN PATENT DOCUMENTS

FR 2901107 A1 * 11/2007

* cited by examiner

PIVOTING BALL MOUNT HAVING FOUR EQUALLY SPACED CONTACT POINTS

CROSS-REFERENCE TO RELATED APPLICATIONS

The present application claims priority from Provisional U.S. Patent Application Ser. No. 60/861,680, filed Nov. 29, 2006 and incorporated herein by reference.

FIELD OF THE INVENTION

The present invention relates to a pivoting mount for use with camera equipment, telescopes and other optical equipment and the like. In one embodiment, the present invention is directed toward a ball mount having four equally spaced contact points.

BACKGROUND OF THE INVENTION

Various ball and swivel mounts are known in the camera and optical arts. Such mounts may be used for still cameras, digital cameras, motion picture cameras, telescopes, binoculars, surveying equipment, and other instrumentation and the like.

The following U.S. Patents and Published Applications and Foreign Patents were discovered in a Prior Art search conducted prior to the filing of the present application. Hart, U.S. Pat. No. 596,207, incorporated herein by reference, discloses a flagstaff holder using ball and socket. See FIGS. 1 and 3 of Hart. Brumley, Published U.S Patent Application No. 2005/0045783, incorporated herein by reference, discloses an adjustable stand for immobilizing and positioning work stock for e.g. welding purposes. Brumley discloses a work stock support that is adjustable since collar responds to engagement and disengagement of collar T-bolts with ball. See FIGS. 3 to 7 of Brumley.

Meinunger, German Patent No. DE2840059, incorporated herein by reference, discloses a stabilizing accessory for a camera tripod, which has spherical side surface at joint with cylindrical projection from swiveling circular disc screwed to housing. Bothe, U.S. Pat. No. 5,871,186, incorporated herein by reference, discloses a frame with retainer, particularly for a camera. Bothe discloses a retainer connected to frame by ball and socket joint, socket being formed as bridge with width less than diameter of ball.

Law, U.S. Pat. No. 3,441,222, incorporated herein by reference, discloses a garden hose positioning device. See FIGS. 1, 2, 3, and 4 of Law. Fungo-Giera, U.S. Pat. No. 1,290,830, incorporated herein by reference, discloses a gun mount that uses a ball and socket. See FIGS. 2 and 3. Schenck, U.S. Pat. No. 1,539,277, incorporated herein by reference, discloses an adjustable ball and socket bracket. See FIG. 3 of Schenck.

Loebs, U.S. Pat. No. 578,998, incorporated herein by reference, discloses a camera tripod that allows angle of camera to be adjusted from the horizontal to vertical. Gelbenegger, U.S. Pat. No. 3,790,965, incorporated herein by reference, discloses an angle adjustment unit for the angular positioning of a prosthesis or orthosis member with respect to a conventional prosthesis joint, comprising a commercial ball-and-socket joint coupled to the conventional prosthesis joint by means of a rod extending through the ball-and-socket joint and projecting at a free end portion into the prosthesis member. See FIGS. 1, 2, and 3 of Loebs.

Rusbach, U.S. Pat. No. 3,958,904, incorporated herein by reference, discloses a ball-and-socket joint for tripod support, which holds a surveying theodolite and maintains it in required position. See FIGS. 11 and 12 of Rushbach. Buerklin, U.S. Pat. No. 6,352,228, incorporated herein by reference, discloses a tripod head having a universal joint, which has a ball joint which is swivelably and rotatably mounted in a bearing housing. The universal joint is arranged between connection points situated on oppositely facing ends of tripod head, one of which is connected or connectable with a camera and the other with a tripod or similar mounting.

Goellner, U.S. Pat. No. 5,544,968, incorporated herein by reference, discloses a lockable ball joint device, which has a ball wither receiving cavity having clamp ring in a casing and spherical concave inner clamping surface engaging outer surfaces of ball and annular extending cam. Kolander, U.S. Pat. No. 687,183, incorporated herein by reference, discloses a tripod joint. See FIGS. 2 and 3. Wright, U.S. Pat. No. 357,299, incorporated herein by reference, discloses a tripod joint. See FIG. 2 of Wright.

Pierce, U.S. Pat. No. 973,558, incorporated herein by reference, discloses an adjustable light fixture using ball and socket. See FIGS. 1 to 6 of Pierce. Hailson, U.S. Pat. No. 6,513,774, incorporated herein by reference, discloses an adjustable mount for e.g. sensors or cameras comprising mounting post with ball and ball clamping members. Brotz, U.S. Pat. No. 6,439,518, incorporated herein by reference, discloses an apparatus for a camera mount on a tripod platform that comprises a cradle cup mounted on tripod platform and O-ring mounted in groove on inside of cup.

Laiho, Published U.S. Patent Application No. 2005/0016433, incorporated herein by reference, discloses using the centralizing control hydraulics comprised in the coupling unit, the pusher is kept centrally positioned in the notch in the stem of the barge as far as possible to maintain equal lateral clearances on both sides. The slide and the hollow shaft are connected by a ball joint, which allows the slide to turn and rotate relative to the shaft.

In addition to the above Patent documents, the following Prior Art photographic ball heads, illustrated in FIGS. 1-3, are known in the art. FIG. 1 illustrates the Arca-Swiss Monoball head with a camera. FIG. 2 illustrates an enlarged view of the Arca-Swiss ball head without a camera. A complete description of the Arca-Swiss Monoball system may be found at http://precisioncameraworks.com/Media/monoball.pdf, incorporated herein by reference. The Arca-Swiss Monoball product is manufactured by ARCA-SWISS PHOTOTECHNIG AG, of Horgan, Switzerland. The Arca-Swiss ball mount uses an asphereical ball. The ball appears to be gripped by the circumferential edge of the housing and a friction mechanism internally. Note how the Arca-Swiss document notes the long felt need in the Prior Art to provide a ball head which allows for smooth panning and even friction application.

FIG. 3 illustrates the Novoflex Magic Ball camera mount manufactured by the Novoflex Corporation, Brahmsstraβe 7 D-87700 Memminge, Germany. The Magic Ball and other ball mounts, such as the ClassicBall (similar to the Arca-Swiss Monoball) are described in more detail at http://www.novoflex.de/english/html/products.htm, incorporated herein by reference. The Magic Ball mount uses a C-clamp like device to clamp to either side of a ball. Only two points or areas are contacted on either side of the ball. On the two larger models, designed for heavier equipment, adjustment is made even easier by an integrated friction setting which is concentric with the lockdown clamp. This variable tension control lets the user match the camera weight to the adjusting force.

SUMMARY OF THE INVENTION

The essence of the present invention is that there are four essentially equal and (generally) evenly spaced constraints on the ball. The points of contact may comprise small pads, in the preferred embodiment, but may also comprise rollers, point contacts, ring contacts, linear contacts, or the like.

Of the Patents cited previously, none specifies a tetrahedral geometry and only a couple of them had geometries even close to a tetrahedral configuration. Furthermore, almost all of the patents used at least one large area or line contact to constrain the ball. (These could be sockets of various geometries, portions of cones, or rings.) None of the cited patents contains the essential characteristics of the present invention.

The present invention is quite simple. It is the equivalent of a ball and socket joint in which the "socket" is composed of four small constraining pads of equal size and equally spaced around the surface of the ball or sphere. Envision four points, each of which is at the center of a constraining pad. Connecting these points with lines defines a regular tetrahedron. A regular tetrahedron is a four-sided solid, all of whose sides are equal, and each face of which is an equilateral triangle.

The two-dimensional equivalent to this method of constraint may be a circle constrained by three equidistant points. Connecting these three points defines an equilateral triangle. For the purpose of exposition, pursue this two-dimensional analogue further. If a circular object is constrained by three equidistant points, the pressure exerted by each of the three points is equal, and if additional pressure is applied to one point, the pressure exerted by the other points increases to equal the increased pressure applied to the first point.

Similarly, if a sphere is constrained by four equidistant points, each point will exert the same amount of force on the sphere. If additional pressure is applied to one point, the pressure exerted by the other points will rise to match this increased pressure.

The effect of constraining a smooth ball by four equidistant points is to create the equivalent of a ball and socket joint in which the force required to rotate the ball at a particular rate is substantially the same in any direction. Consider the domain of ball and socket tripod heads such as those shown in FIGS. 1-3. The balls are constrained by various means other than the method of the present invention. The constraining surfaces may include larger socket areas (concave surfaces that conform to the surface of the constrained sphere). It may be easier to rotate the ball about one axis than it is to rotate it about another axis. Because of this, if a user applies force designed to rotate the ball about a particular axis, the ball may rotate about a somewhat different axis, making it difficult to aim the camera, lens or other device attached to the ball head.

A ball head constructed according to the principles of the present invention such that the ball is constrained by four equidistant points may be made so that the ball moves smoothly and predictably in any direction. This design may be applied to ball heads (ball tripod heads) where the ball moves with the camera such as the Arca-Swiss ball head. It may also be applied to ball heads where the ball is fixed and the housing moves with the camera such as the Magic Ball. The design may also be applied to other mechanisms where a smooth and predictable movement of a ball in a socket is desirable.

The four constraining pads may be adjusted by increasing the pressure on one of the pads. The pads may be left slightly loose for very free movement, may be tightened a little for controlled drag, or may be tightened additionally to lock the ball in a position. Pressure may be applied to the pads in a variety of ways, the simplest of which involves mounting one of the pads on the end of a threaded rod that may be turned with a knob. In order to manipulate such a threaded rod more conveniently, gears, sprockets and chain, and similar mechanisms may be used to put the knob in a more accessible position.

Controlled drag may be provided, when the ball is not locked down, by constraining the motion of the clamping pad so that it may be backed off only a certain amount. Another method of providing drag involves surrounding one pad with a concentric ring (or partial ring) of pad material. The ring and central pad may be operated by different mechanisms. One of them may provide drag adjustment and the other one may be used for locking the ball in place.

The clamping pad does not have to be on the end of a threaded rod. Levers, arms, and other mechanisms may be employed to apply pressure to the moveable (clamping) pad. Two different control rods on the same lever arm may be used to tighten or adjust the location of the moveable pad. One control rod could provide the default level of drag and the other control rod may provide the clamping pressure.

The four constraining pads may ideally be equidistant from one another. On the other hand, the particular orientation of the four pads with respect to other parts of the mechanism may vary as suits the application. For example, in an embodiment like the Magic Ball configuration, where the ball is on the bottom and the clamping mechanism on top, one might want to have one of the pads oriented vertically when the camera is horizontal. On a preferred embodiment, another configuration might be more suitable, for example where two pads are located on a top portion of the ball at equidistant points from the top center of the ball and two pads are located on the bottom portion of the ball at equidistant points from the bottom center of the ball.

The design presented here is expanded to include arrangements that use four nearly equally spaced constraining pads. There may be applications where in it is impossible to achieve the optimal geometry of the equally spaced pads. In these situations a configuration with nearly equally spaced pads may function adequately. In such a case an alternate geometry may be constructed wherein the pressure on all of the pads is equal but the constraint on of the ball is not fully symmetric.

DETAILED DESCRIPTION OF THE INVENTION

Figure 4:
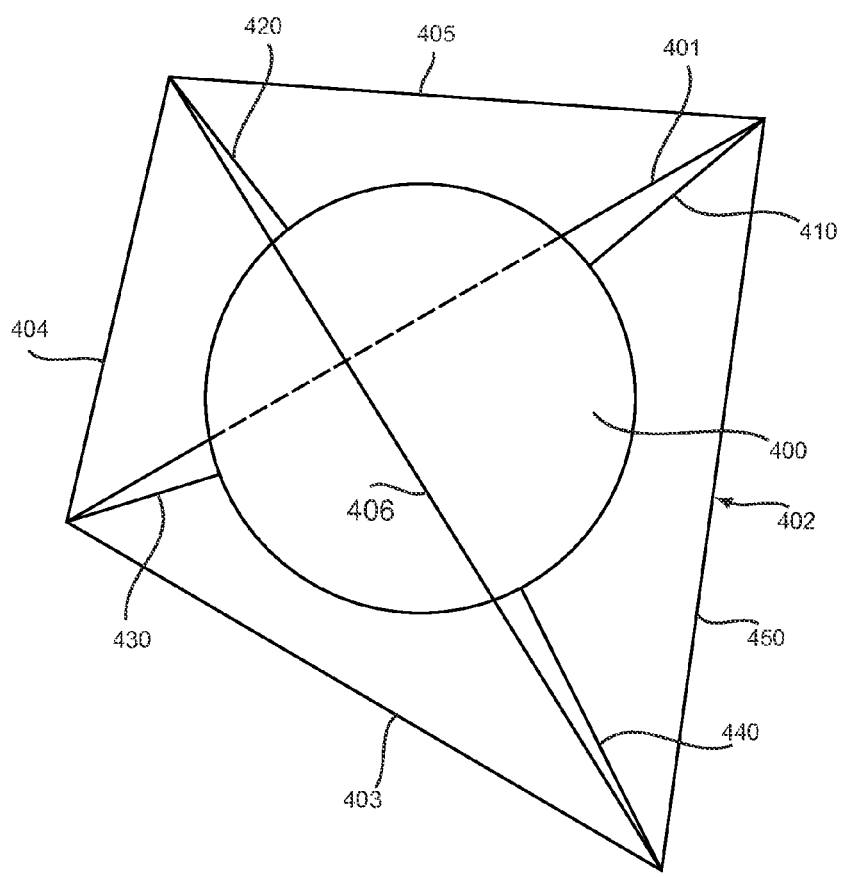
FIG. 4 is a perspective view of the relationship between a ball and an imaginary tetrahedron shape, the centers of which coincide. The Figure illustrates how lines between the four apexes of a tetrahedron shape and the center of the ball may intersect the surface of the ball.
Figure 15:
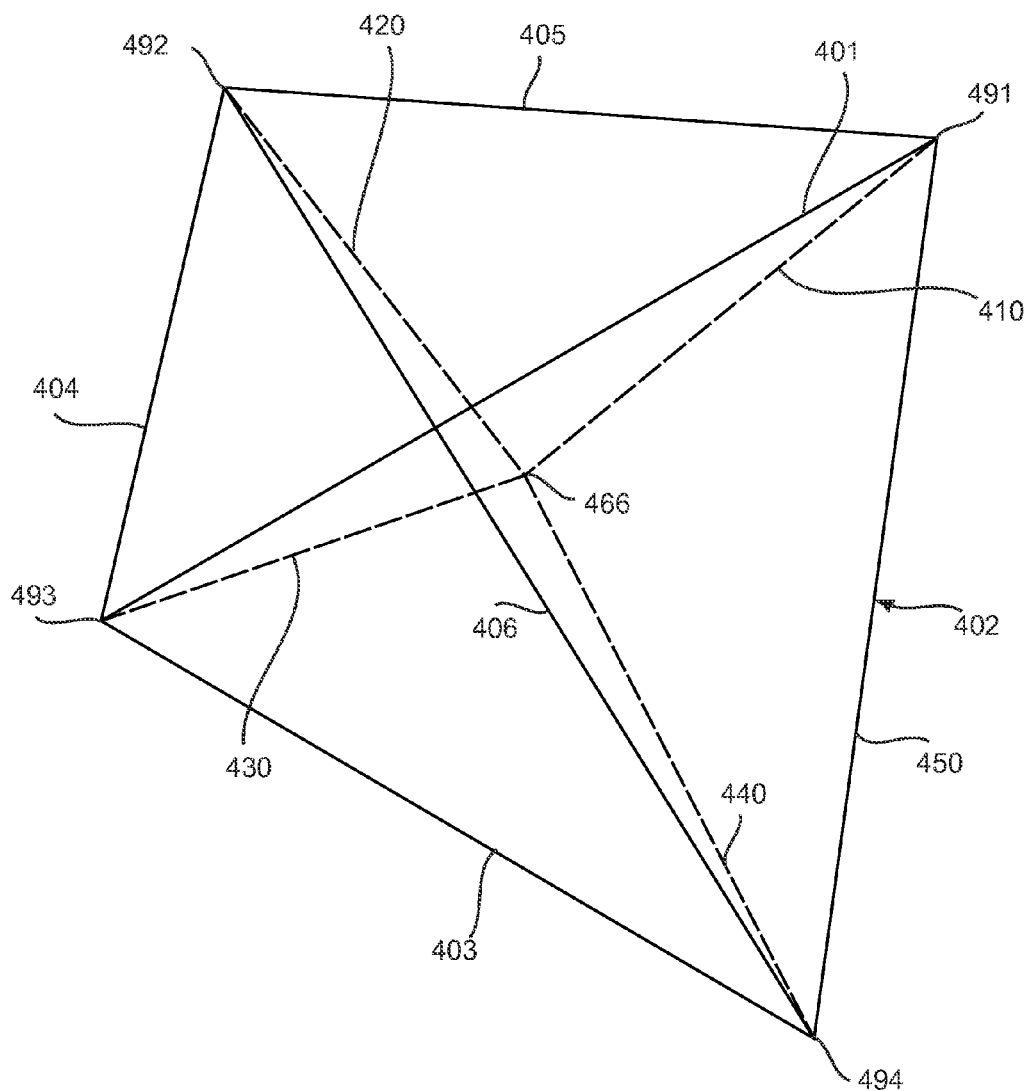
FIG. 15 is an perspective view of a wire-frame model of the tetrahedron shape of FIG. 4, with the ball removed.

FIG. 4 is a perspective view of the relationship between a ball and a tetrahedron shape, the centers of which coincide, illustrating how lines between the four apexes of a tetrahedron shape and the center of the ball may intersect the surface of the ball. FIG. 15 is an perspective view of the tetrahedron shape of FIG. 4, with the ball removed.

The essence of the present invention is that is that there are four essentially equal and (generally) evenly spaced constraints on the ball. The constraints may comprise small pads, in the preferred embodiment, but may also comprise rollers, point contacts, ring contacts, linear contacts, or the like.

The concept behind the present invention is quite simple. It is the equivalent of a ball and socket joint in which the "socket" is composed of four preferably small constraining pads of equal size and equally spaced around the surface of the ball or sphere 400. FIG. 4 shows a sphere 400 surrounded by a regular tetrahedron shape defined by lines 401, 402, 403, 404, 405, and 406. The centers of the tetrahedron shape and the sphere coincide. Lines 410, 420, 430, and 440 extend from the vertexes 491, 492, 493, and 494 of the tetrahedron shape to the center of the sphere and the tetrahedron shape (illustrated as point 466 in FIG. 15). The points that are the intersections of these lines with the surface of the sphere, locate the centers of the constraining pads. Connecting these points with lines constructs a second, smaller regular tetrahedron shape inside the initial tetrahedron shape 450 and oriented the same as 450. A regular tetrahedron, for example, as defined by 450, is a four-sided solid, all of whose sides are equal, and each face of which is an equilateral triangle.

The two-dimensional equivalent to this method of constraint may be a circle constrained by three equidistant points. Connecting these three points constructs an equilateral triangle. For the purpose of exposition, pursue this two-dimensional analogue further. If a circular object is constrained by three equidistant points, the pressure exerted by each of the three points is equal, and if additional pressure is applied to one point, the pressure exerted by the other points increases to equal the increased pressure applied to the first point.

Similarly, if a sphere is constrained by four equidistant points, each point will exert the same amount of force on the sphere. If additional pressure is applied to one point, the pressure exerted by the other points will rise to match this increased pressure.

Figure 2:
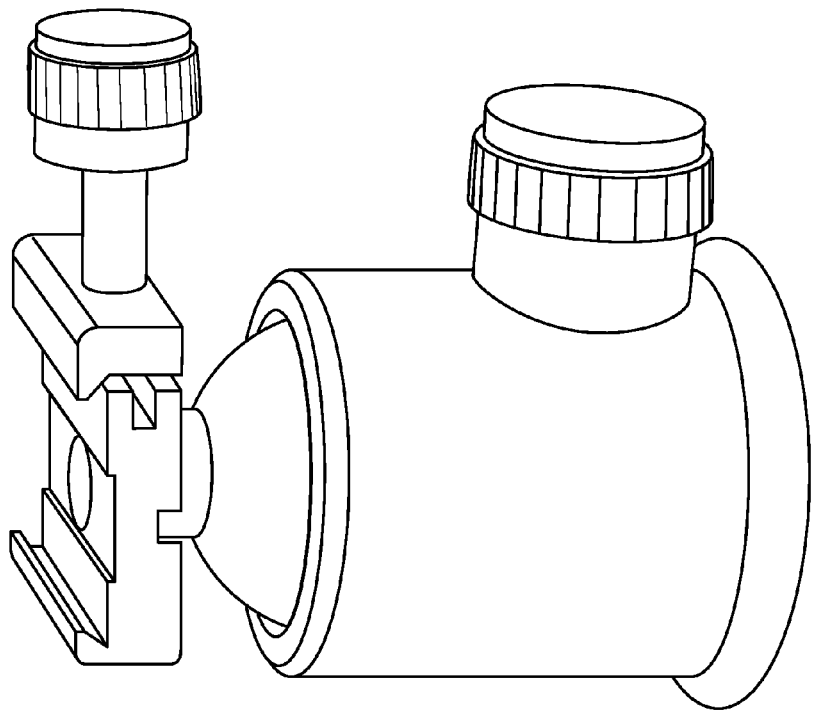
FIG. 2 illustrates an enlarged view of the Arca-Swiss ball head without a camera.
Figure 1:
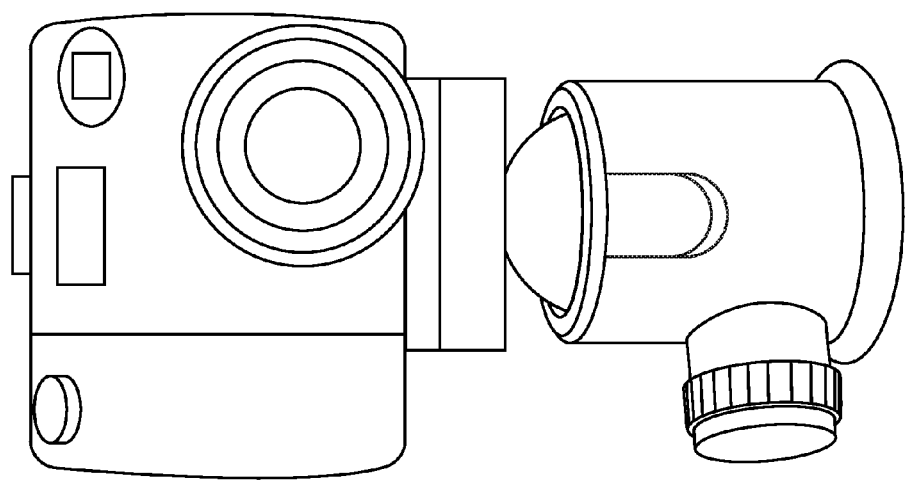
FIG. 1 illustrates the Arca-Swiss Monoball head with a camera.
Figure 3:
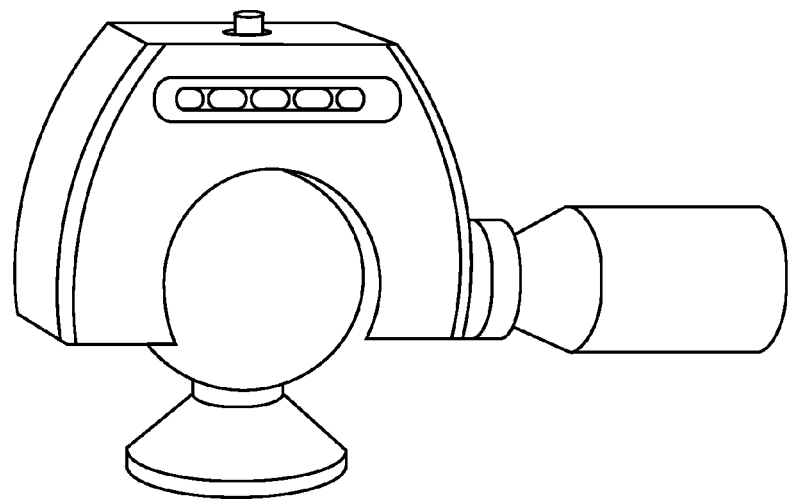
FIG. 3 illustrates the Novoflex Magic Ball camera mount.

The effect of constraining a smooth ball by four equidistant points is to create the equivalent of a ball and socket joint in which the force required to rotate the ball at a particular rate is substantially the same in any direction. Consider the domain of ball and socket tripod heads such as those shown in FIGS. 1-3. The balls are constrained by various means other than the method of the present invention. The constraining surfaces include larger socket areas (concave surfaces that conform to the surface of the constrained sphere). Invariably, it is much easier to rotate the ball about one axis than it is to rotate it about another axis. Because of this, if a user applies force, for example to a camera, intended to rotate the ball about a particular axis, the ball may rotate about a somewhat different direction, making it difficult to aim the camera, lens or other device attached to the ball head.

Figure 5:
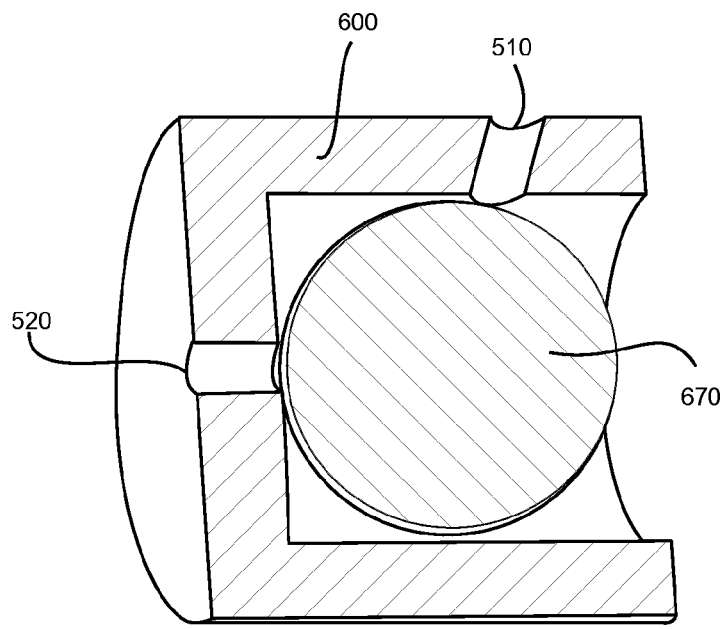
FIG. 5 is a cross-sectional view of one embodiment of the present invention, illustrating how cylindrical holes accommodating two of the four contact points may be formed in the ball housing.

FIG. 5 is a cross-sectional view of one embodiment of the present invention, illustrating how two of the four holes or passages that locate control rods terminating in contact pads may be formed in the ball housing. Note that the embodiment of FIGS. 5-8 is by way of example only and illustrates a proof-of-concept prototype. When productized, the finished product may be made in the format of one of the embodiments of FIGS. 1-3, for example, and may be provided with a more finished appearance and user-friendly controls.

Figure 13:
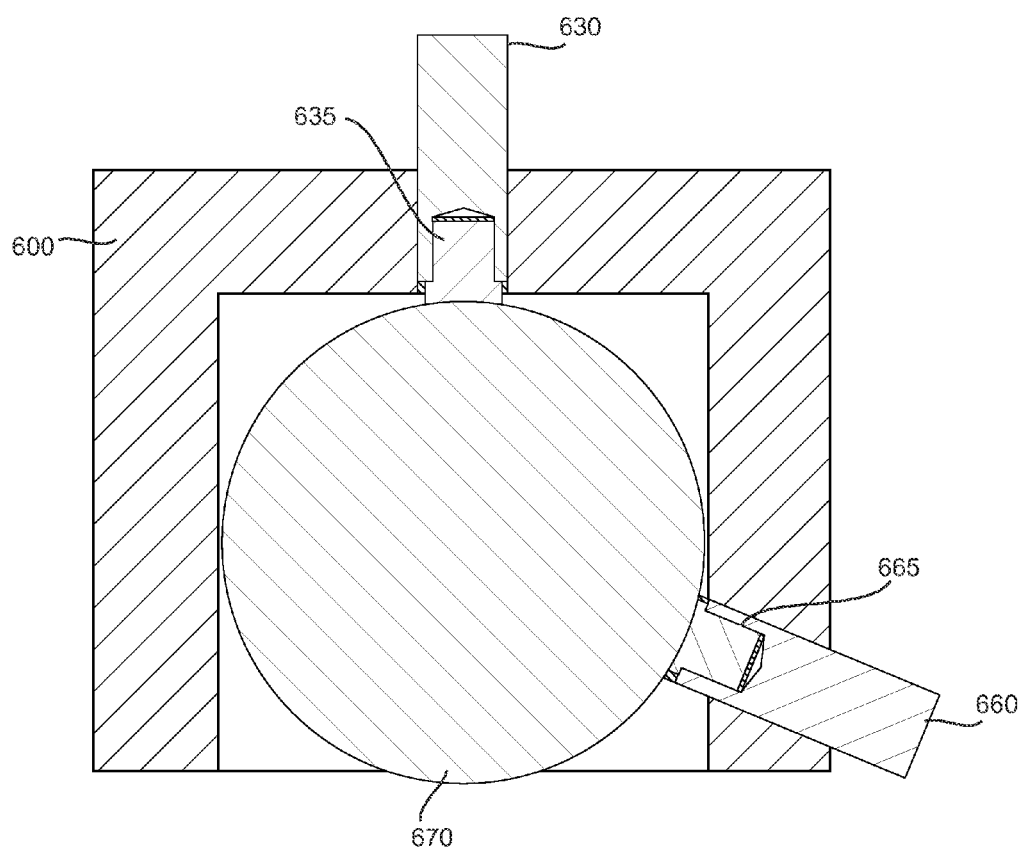
FIG. 13 is a cross-section view of the embodiment of FIG. 5 illustrating how contact pads may be provided.

Referring to FIGS. 5 and 13, Ball 670 may be contained within housing 600. Ball 670, in this embodiment may be approximately two inches in diameter. Other sizes may be used within the spirit and scope of present invention depending upon application. Housing 600 is shown here as a cylindrical shape, for purposes of illustration. Such a cylindrical shape provides advantages in machining and production. However, other shapes may be used within the spirit and scope of the present invention, including but not limited to, cubic, spherical, oval, or other shapes.

Housing 600 may be provided with a number of passages 510, 520, preferably four, for receiving threaded control rods 630, 660 (others not shown). Note that in this and other embodiments disclosed herein, threaded control rods are recited as used to hold the contact pads 635, 665 (others not shown) in place. However, other means may be employed within the spirit and scope of the present invention, to secure the contact pads 635, 665 to the housing 600. For example, contact pads 635, 665 may be secured directly to the housing 600, or may be secured by means of fixed mounts, levers, or the like. At least one of the pad mounts 630, 660 should be adjustable to provide variable resistance to movement and a locking feature. Alternately, the pads 635, 665 may be spring loaded or otherwise held in pressure contact with the ball.

In this cross-sectional view, only two such passages 510, 520 are shown, due to the nature of the cross-section view. In the preferred embodiment, four passages are machined into housing 600 at spacing and angles such that they intersect the surface of ball 670 at a substantially equidistant spacing, as illustrated in FIG. 4. In an alternative embodiment, the spacing may be altered to provide for a greater range of movement of the ball joint or for other purposes (ease of manufacturing, or the like).

Figure 6:
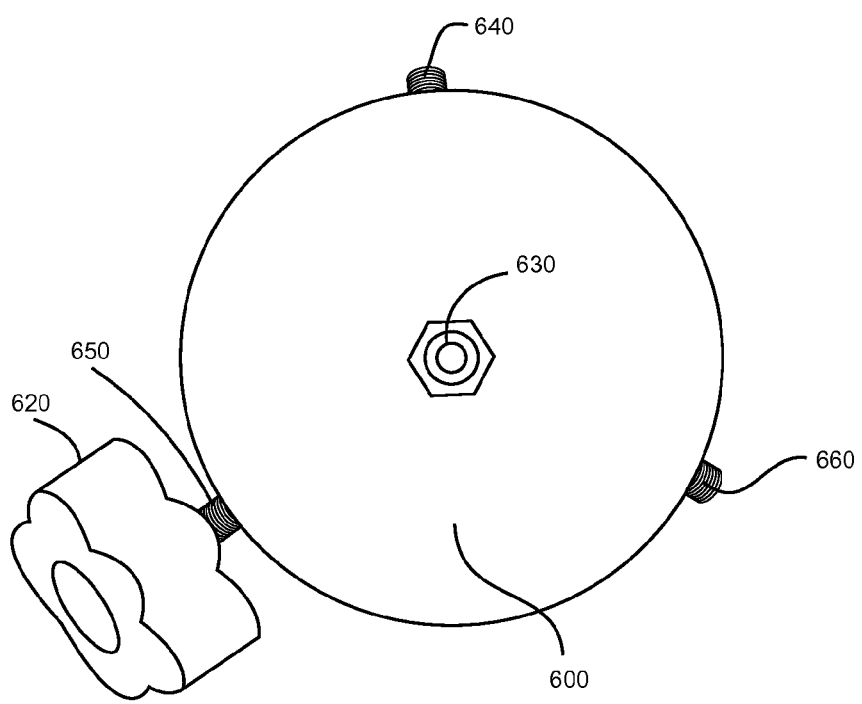
FIG. 6 is a top view of one embodiment of the present invention, illustrating the four contact point control rods.
Figure 8:
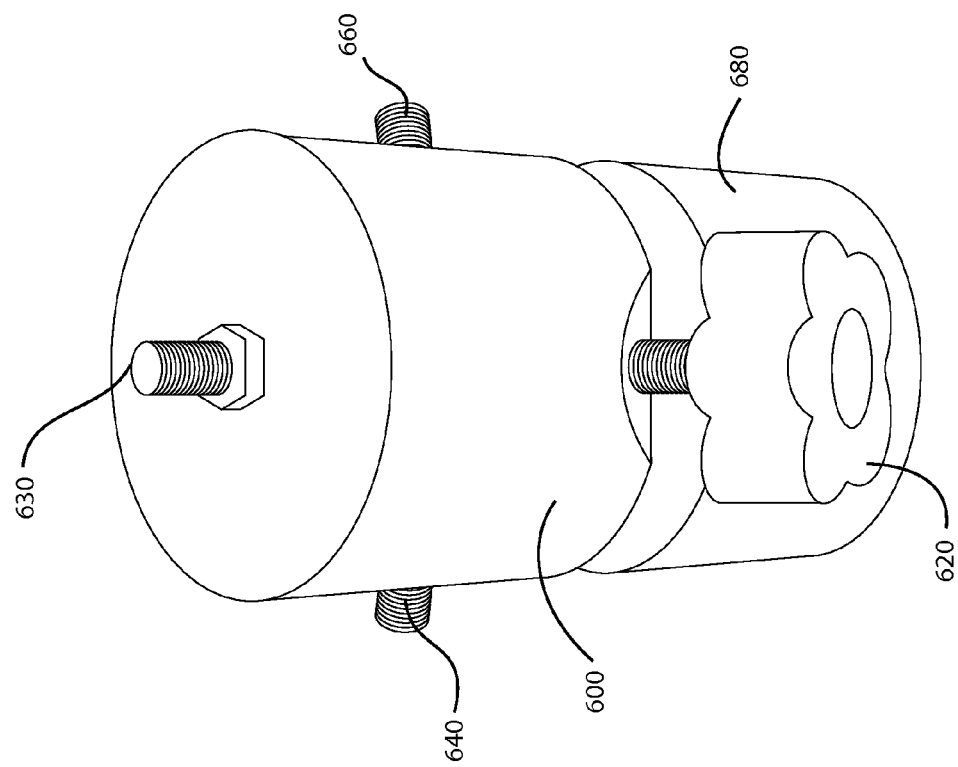
FIG. 8 is a perspective view of one embodiment of the present invention, illustrating the four contact point control rods.
Figure 7:
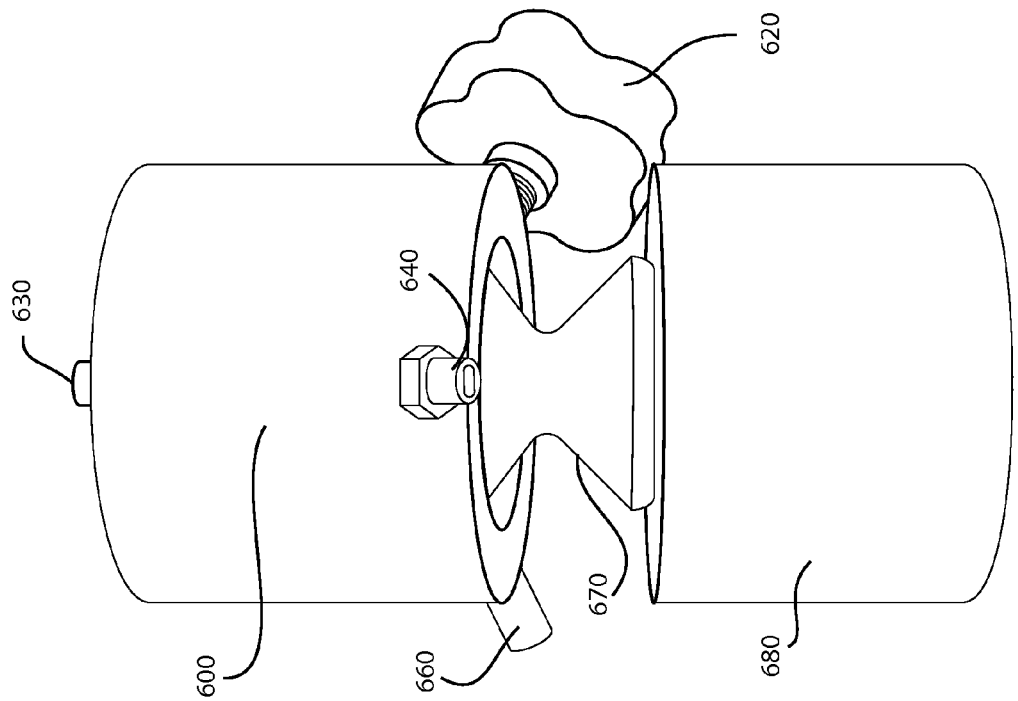
FIG. 7 is a side view of one embodiment of the present invention, illustrating the four contact point control rods.

FIG. 8 is a perspective view of one embodiment of the present invention. FIG. 6 is a top view of one embodiment of the present invention, illustrating the four contact point control rods. FIG. 7 is a side view of one embodiment of the present invention, illustrating the four contact point control rods.

Referring to FIGS. 6-8, threaded control rods 630, 640, 650, and 660 may be placed and angled such that they intersect the surface of ball 670 at largely equidistant points, as discussed previously with regard to FIG. 4. The threaded control rods are oriented so that the axis of each rod intersects the center of the sphere, which is equivalent to saying that the axes are perpendicular to the surface of the sphere. Threaded control rods 630, 640, 650, and 660 may be provided with pads (not shown) at the point of contact with ball 670. Such pads may be concave in shape to match the shape of the surface of ball 670. Alternately, control rods 630, 640, 650, and 660 themselves may be machined with a concave surface to match the curvature of ball 670. Other contact arrangements may be used within the spirit and scope of the present invention. For example, concave pads, spherical rollers, point contacts, flat or circular (ring) contacts, or the like may be used, depending upon desired pressure application to the surface of ball 670. In the preferred embodiment, a concave pad may be used.

As previously noted, the embodiment of FIGS. 5-8 is by way of example only as a proof-of-concept prototype. Thus, while a large base 680 is illustrated in FIGS. 7 and 8, such a base may not be used in a production model. Furthermore the entire apparatus may be inverted so that it assumes a configuration similar to that of the ball heads show in FIGS. 1 and 2.

In the preferred embodiment, the four pressure pads (not shown) may be substantially 5/16" in diameter, and control rods 630, 640, 650, and 660 may be 3/8-16 thread. The embodiment of FIGS. 5-8 is one attractive configuration with one of the pressure pads and control rod 630 in the vertical orientation. In this arrangement the top pressure pad, which carries the weight of the camera or other equipment, rests on the top surface of ball 670. This may allow for easier panning motion, as the housing pivots on the single pad, when the other pressure pads are loose. Other configurations are also meritorious. The pressure pads are generally in the tetrahedral configuration, but the location of the pads with regard to other parts of the mechanism may vary.

Knobs such as 620 may be used to tighten or loosen threaded control rods 630, 640, 650, and 660. In the illustrated embodiment, one knob 620 is shown. A single knob may be used and switched between control rods 630, 640, 650, and 660. However, as noted above, since the pressure points are equidistant, it may not be necessary to tighten other control rods in order to provide an even control pressure on ball 670. Thus, in the preferred embodiment, three of four control rods 630, 640, 650, and 660 may be fixed in position, and one of the rods provided with an adjustment for controlling drag and/or lock. Alternately, each control rod 630, 640, 650, and 660 may be provided with a knob 620, or a mechanism may be provided to adjust some or all control rods 630, 640, 650, and 660 simultaneously or selectively.

As noted above, control rods 630, 640, 650, and 660 may be provided with a second coaxial control rod within or without to selectively allow control of lock and drag features separately.

A ball head constructed according to the principles of the present invention such that the ball is constrained by four equidistant points may be made so that the ball moves smoothly and predictably in any direction. This design may be applied to ball heads (ball tripod heads) where the ball moves with the camera such as the Arca-Swiss ball head of FIGS. 1-2. It may also be applied to ball heads where the ball is fixed and the housing moves with the camera such as the Magic Ball of FIG. 3. The design may also be applied to other mechanisms where a smooth and predictable movement of a ball in a socket is desirable.

The four constraining pads may be adjusted by increasing the pressure on one of the pads using one of control rods 630, 640, 650, and 660. The pads may be left slightly loose for very free movement, may be tightened a little for controlled drag, or may be tightened additionally to lock the joint in a position. Pressure may be applied to the pads in a variety of ways, the simplest of which involves mounting one or more of the pads on the end of a threaded rod 630, 640, 650, 660 that may be turned with a knob. In order to manipulate such a threaded rod more conveniently, gears, sprockets and chain, and similar mechanisms may be used to put knob 620 on a more accessible position.

Figure 9:
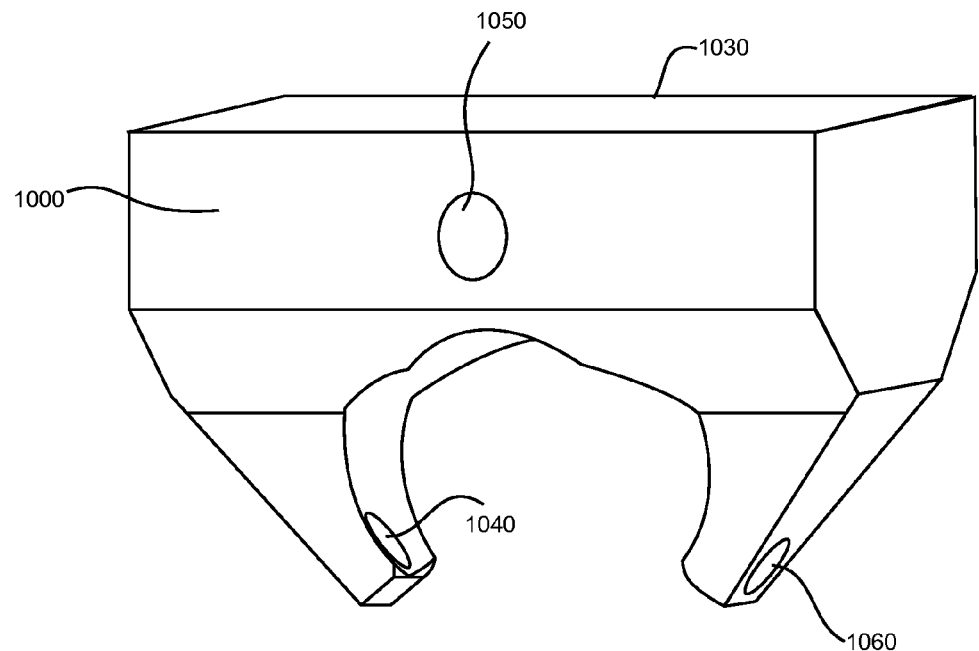
FIG. 9 is a perspective view of a second embodiment of the present invention, illustrating the location of four contact point control rods holes on the housing.
Figure 10:
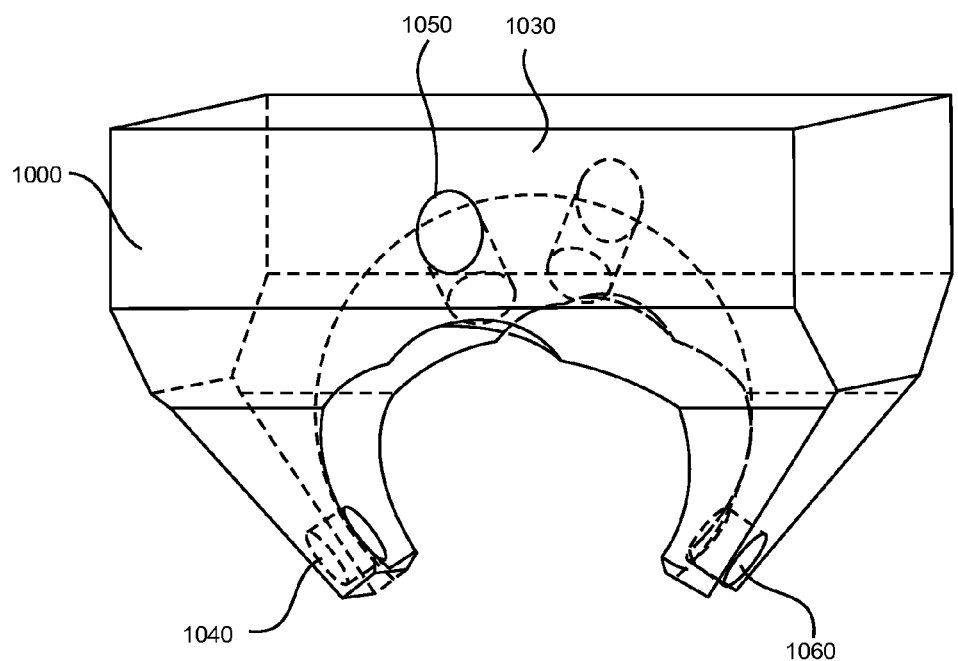
FIG. 10 is a perspective view of a second embodiment of the present invention, with hidden lines shown, illustrating the location of the four contact point control rods on the housing.
Figure 11:
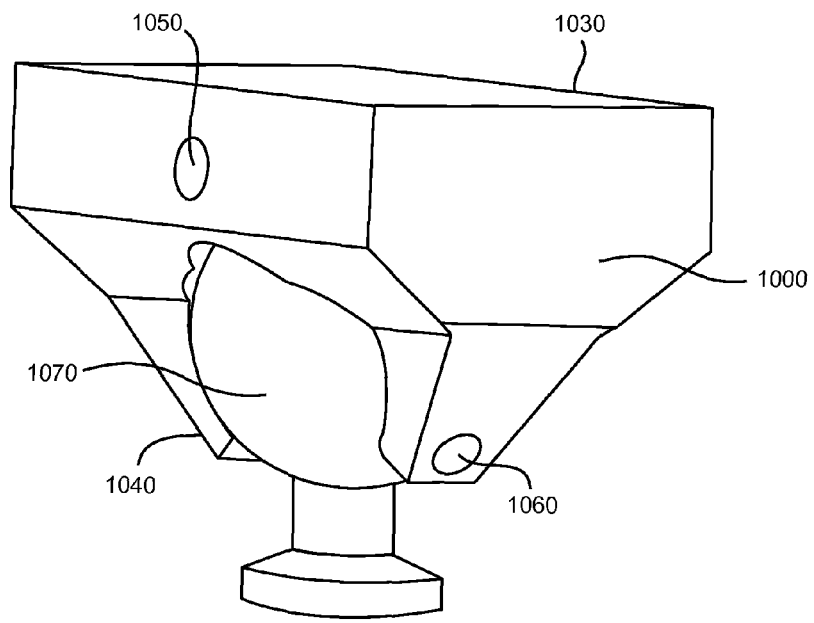
FIG. 11 is a perspective view of a second embodiment of the present invention, illustrating the four contact control rods, showing the device assembled on a ball.

FIG. 9 is a perspective view of a second embodiment of the present invention, illustrating the location of four contact point control rods holes on the housing. FIG. 10 is a perspective view of a second embodiment of the present invention, with hidden lines shown, illustrating the location of the four contact point control rods on the housing. FIG. 11 is a perspective view of a second embodiment of the present invention, illustrating holes for the four contact point control rods, showing the device assembled on a ball.

FIGS. 9-11 depict another orientation of the tetrahedral geometry with respect the plane where the camera or lens may mount. There are advantages to this particular orientation, although the two orientations thus far depicted are only two of an infinite number.

Holes 1030, 1040, 1050, and 1060 in outer body 1000 show where pusher rods or elements may exist. No mechanism for tightening the device is illustrated in these Figures. Various tightening mechanisms may be employed to act on one of the pusher rods in one of the lower two holes or on one of the pusher rods in one of the upper two holes, as noted previously. Housing 1000 may be assembled to ball 1070 to form the overall assembly, and then control rods or mechanisms (not shown) inserted into holes 1030, 1040, 1050, and 1060.

Figure 12:
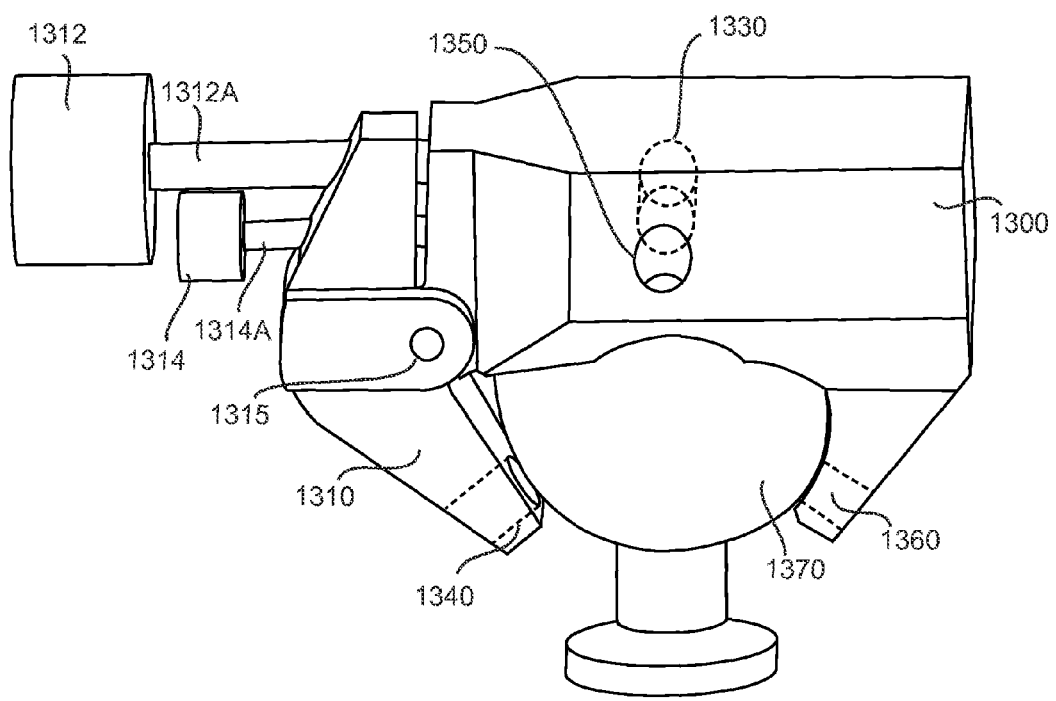
FIG. 12 is a perspective view of a third embodiment of the present invention, illustrating an adjustment mechanism for locking the device. This adjustment mechanism allows the device to be detachably assembled to the ball.

Note that the geometry of the housing 1000 in FIGS. 9-11 is such that inserting a ball may be physically difficult. Insertion of ball 1070 may require deformation of housing 1000 (i.e., if it is deformable material) or may require a cutaway portion or assembly of housing 1000 from components (e.g., with fasteners, adhesives, or the like). FIG. 12 is a perspective view of a third embodiment of the present invention, illustrating an adjustment mechanism for locking the device that also allows the device to be detachably assembled to the ball.

In the embodiment of FIG. 12, body 1300 may be attached to lever 1310 via pivot point 1315. Lever 1310 may contain a hole 1340 for accepting a control rod, or alternately, a control pad or the like may be formed at the point where hole 1340 is located. Control knobs 1312 and 1314 may be provided to control lock and drag of the apparatus, such that the mount may be moved under adjustable drag or resistance or locked into place. Knob 1312 maybe connected to first shaft 1312A while knob 1314 may be connected to second control shaft 1314B mounted to a common lever arm 1310 to tighten and adjust the at least one of the four constraints 1330, 1340, 1350, 1370, where the first control shaft 1312A controls the clamping pressure and the second control shaft 1314A controls the level of drag, In one embodiment, the pin 1315 that attaches the lever 1310 to the body 1300, may be removed so that the lever and body may be separated, thus allowing the ball 1370 to be inserted into or removed from the body 1300. Holes 1330, 1350 and 1360 may accept control rods or other mechanisms (pads or the like) at predetermined locations (as described herein) or may be the locations of molded in or machined in (or attached) pads or contact points. In practice, only the contact point at location 1340 need be adjusted to control drag and lock, with the four contact points each providing equal pressure on ball 1370.

Controlled drag may be provided, when the ball is not locked down, by constraining the motion of the clamping pad so that it may be backed off only a certain amount.

Figure 14:
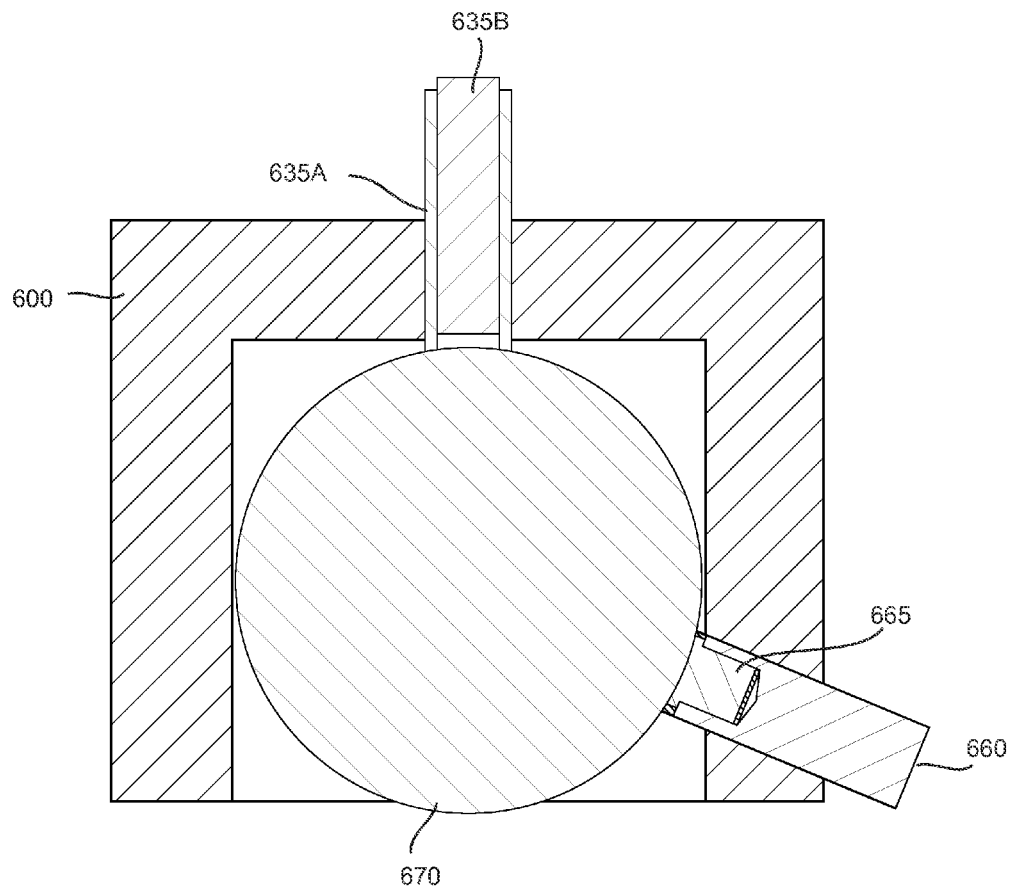
FIG. 14 is a cross-section view of the embodiment of FIG. 5 illustrating how contact pads may be provided, including an adjustable pad providing drag by surrounding one pad with a concentric ring (or partial ring) of pad material.

FIG. 14 is a cross-section view of the embodiment of FIG. 5 illustrating how contact pads may be provided, including an adjustable pad providing drag by surrounding one pad 635B with a concentric ring (or partial ring) of pad material 635A. The concentric ring (or partial ring) ring 635A and central pad 635B may be operated by different mechanisms. One of them may provide drag adjustment and the other one may be used for locking the ball in place.

As previously noted, the clamping pad does not have to be on the end of a threaded rod 630, 640, 650, 660. Levers, arms, and other mechanisms may be employed to apply pressure to the moveable (clamping) pad. Two different control rods on the same lever arm may be used to tighten or adjust the location of the moveable pad. One may provide the desired level of drag and the other may provide the clamping pressure.

Different activation mechanisms may be employed to adjust the drag and lock on the ball. As previously stated, a variety of mechanisms may be used to apply pressure to one, or sometimes more than one, of the contact pads. As previously discussed, in the most obvious method a contact pad is located on the end of the threaded rod contained in a threaded hole in the housing. Turning this threaded rod advances the contact pad and causes an increase in the pressure exerted by that pad. The threaded rod may be activated directly, as with a knob, or indirectly by such mechanisms as gears, sprockets and chains and so forth.

A second method may employ a lever. One way of using a lever is to put a contact pad on one end of the lever and one or two threaded rods with knobs inserted into threaded holes on the other end, with a fulcrum between the contact pad and the threaded rods. Turning the knobs may cause that end of the lever to move away from the housing, and may cause the contact pad to move closer to the ball. One knob may be used to control drag and the other to lock the ball in place.

The simplest place to put a knob is on a threaded rod that extends radially from the ball at one of the points of contact. Unfortunately, such a location may be inconvenient for a given application. In order to locate a knob, turning lever, wing nut, or other device in a convenient location, more complex methods may be used to apply pressure to a contact pad. Such devices may include a cylindrical hole in which a close-fitting cylindrical slug of material, terminating in a contact pad, may slide. The slug may be forced directly by the end of a lever. In another arrangement the slug may be followed by a hard ball, which also fits closely in the cylindrical hole. The geometry of the ball in the hole allows force applied to the ball in one direction to be redirected along the axis of the cylindrical hole onto the slug. Linkages and cams and other means may also be employed to apply pressure to contact pads.

The four constraining pads may ideally be equidistant from one another. On the other hand, the particular orientation of the four pads with respect to other parts of the mechanism may vary as suits the application. For example, in an embodiment like the Magic Ball configuration, of FIG. 3, where the ball is on the bottom and the clamping mechanism on top, one might want to have one of the pads oriented vertically when the camera is horizontal. On the other hand, another configuration might be more suitable to allow for greater movement of the ball joint, to place a control knob for pad tension adjustment at a more convenient location, or to improve manufacturability of the product.

In such embodiments, it is preferable to have the pads at substantially equidistant locations, or try to provide a number of the pads (in the preferred embodiment, four pads) in a symmetrical arrangement. Thus, for example, in an alternative embodiment of FIGS. 5-8, the lower control rods 640, 650, and 660 may be moved upward slightly along the surface of the sphere to allow for a greater range of motion for the device, but may still be equidistant to one another. Thus, the three lower contact points may still form an equilateral triangle, but may be moved upward, closer to the "equator" of the ball 670. Furthermore the plane established by the three points may still be substantially parallel to the equatorial plane.

Equidistant spacing of the contact pads is the preferred or ideal geometry. The center of each contact pad is then at the vertex of a regular tetrahedron shape. Deviations from this geometry may have advantages in the use or manufacture of the product. In alternative embodiments of the present invention, two such deviations from equidistant spacing that retain some symmetry may be employed. Refer first to FIGS. 5 through 8. For convenience, some geographical analogies are employed. The vertical axis will be called the polar axis and the uppermost portion of the ball will be called the North Pole. The location of the equator and the equatorial plane is now established. In this embodiment, one contact point is located at the North Pole. The other three are located in a plane parallel to and below the equatorial plane. By moving these three contact points closer to the equator, but by keeping these three points equidistant from one another, one deviates from ideal geometry while retaining a certain degree of symmetry. Such a modification of ideal geometry might create additional range of motion for the stem of the ball.

The design presented here is expanded to include arrangements that use four nearly equally spaced constraining pads. There may be applications wherein it is impossible to achieve the optimal geometry of equally spaced pads. In these situations a configuration with nearly equally spaced pads may function adequately. In such a case a second alternate geometry may be constructed that maintains sufficient symmetry so that the pressure on all of the pads is equal but the constraint of the ball is not fully symmetric. In order to describe one example of such a configuration, it is useful to establish some geometric references. A central axis runs through a sphere, penetrating the surface of the sphere in two places called the first pole and the second pole. Two points will be equidistant from the first pole, and closer to the first pole than to the second pole. The other two points will be equidistant from the second pole, and closer to the second pole than to the first pole. The distance from each point to its nearest poleis equal. The two points that are closer to the first pole are arranged such that they will both be included in a plane that includes the central axis. The two points that are closer to the second pole are arranged such that they will both be included in a plane that includes the central axis and is perpendicular to the plane that contains the two points that are closest to the first pole. Advantages of such a design may be that it allows for easier insertion of the ball during manufacturing or use, and allows for greater range of movement of the ball mechanism.

This second alternative geometry may be employed in the case of the configuration represented in FIGS. 9 through 12. In this case, if the upper surface of the housing is horizontal, the upper two contact points may lie in a horizontal plane that is a certain distance above the equator and the lower two points may lie in a horizontal plane that is the same distance below the equatorial plane. The top two points may also be contained in a first vertical plane that passes through the center of the sphere. This first vertical plane is perpendicular to a second vertical plane that contains the bottom two points and also passes through the center of the sphere. If we move the top two points downward so that they lie in a different horizontal plane, and move the lower two points upward an equal distance and if we keep the pairs of points in the same (perpendicular) vertical planes, we have established a "squashed tetrahedron" shape that deviates from the ideal geometry. The interesting thing about this geometry, however, is that sufficient symmetry is maintained so that the force applied by each of the contact points is substantially equal. The contact points of course are not equally spaced around the sphere, so that one may assume that the force required to create rotation of the ball will vary with the direction of rotation desired.

The two deviations from ideal geometry discussed above, retain a certain degree of symmetry. Other, less symmetric deviations may be desirable given the specific needs of a given application.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An articulating joint for joining a first element to a second element, the articulating joint comprising:
   a housing for attaching the articulating joint to the first element;
   a substantially spherical ball for attaching to the second element;
   four constraints mounted to the housing, and in contact with the substantially spherical ball, for restraining the substantially spherical ball while allowing the ball to rotate around three axes relative to the housing;
   wherein at least one of the four constraints further comprises an adjuster for adjusting pressure on at least one of the four constraints to the substantially spherical ball, wherein the constraints may be left slightly loose for very free movement, tightened for controlled drag, and tightened additionally to lock the substantially spherical ball in a position,
   wherein the adjuster comprises one of a threaded rod, lever, and arm to apply selective pressure to the at least one of the four constraints, and
   wherein the adjuster comprises a first control shaft and a second control shaft mounted to a common lever arm to tighten and adjust the at least one of the four constraints, wherein the first control shaft controls a clamping pressure and the second control shaft controls a level of drag.

* * * * *